United States Patent Office 3,320,514
Patented May 16, 1967

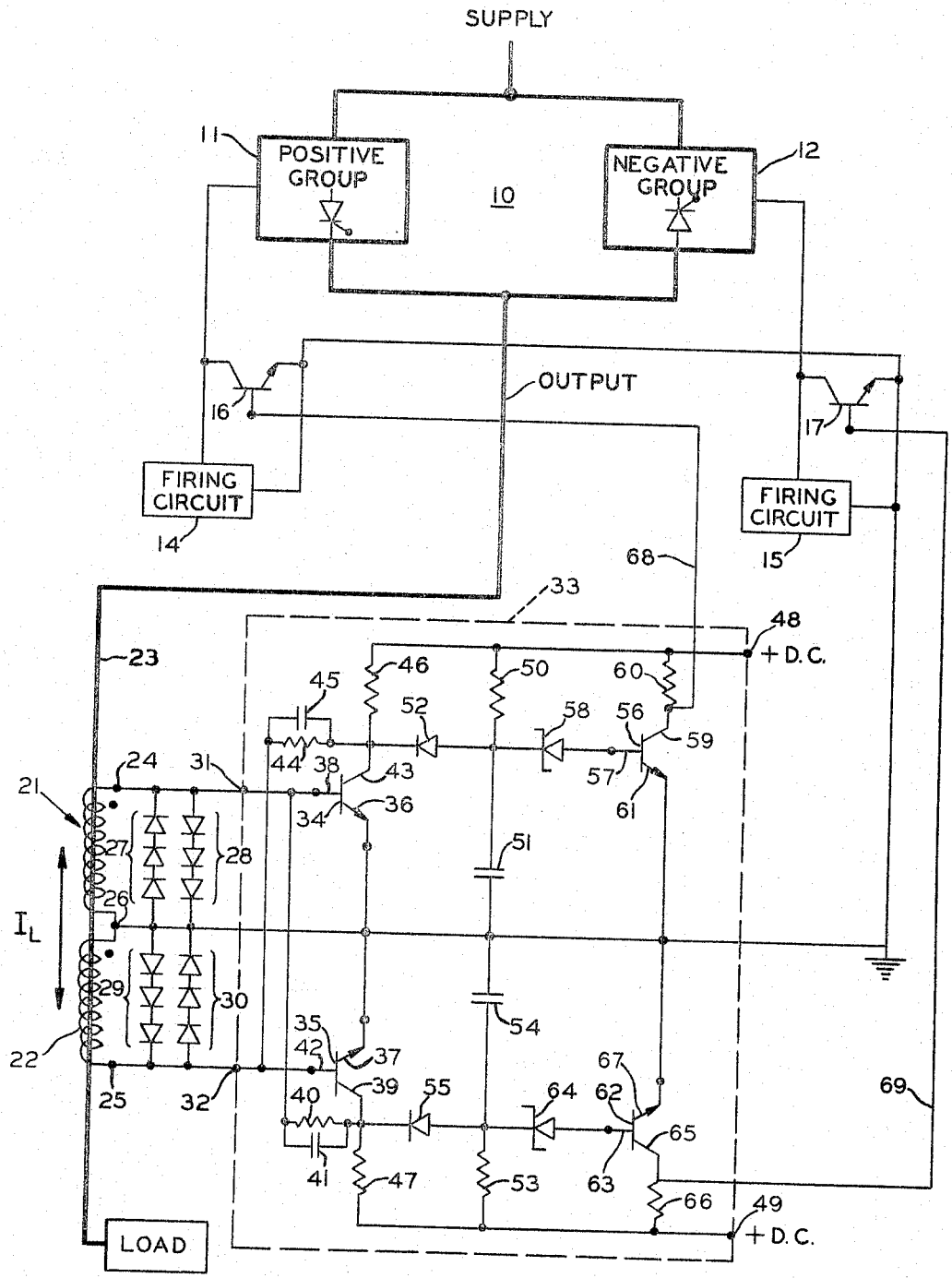

3,320,514
CIRCUIT MEANS FOR SELECTIVELY SWITCHING CURRENT-CONDUCTING GROUPS OF A CYCLOCONVERTER IN RESPONSE TO OUTPUT CURRENT
Dennis I. Lawrence, Solon, Ohio, assignor to Lear Siegler, Inc., Los Angeles, Calif., a corporation of Delaware
Filed Sept. 27, 1963, Ser. No. 312,110
10 Claims. (Cl. 321—45)

This invention relates to cycloconverters and their operation and particularly to circuit means for selectively switching positive and negative current-conducting groups within a cycloconverter in accordance with the cycloconverter alternating output current or an alternating current corresponding thereto.

A cycloconverter characteristically comprises two major elements, a positive current group and a negative current group, connected in parallel between a supply and the cycloconverter output which is connected to a load. As is well known, each group may consist of a number of rectifying and switching devices, such as mercury arc rectifiers, silicon controlled rectifiers, or thyratrons, connected in some well-known rectifier configuration. The output current from each group can flow in only one direction. Therefore, in order to supply an alternating output current, the positive and negative groups must be connected back-to-back with respect to the output circuit so that each group may alternately provide a half cycle of each full cycle of output current $I_L$.

It is well known in the cycloconverter art that instantaneous voltage differences may exist between the positive and negative groups of switching and rectifying devices. These voltage differences produce currents which circulate between the positive and negative groups within the cycloconverter if steps are not taken to positively interrupt their paths or suppress the circulating current paths between the two groups or otherwise suppress them. Intergroup circulating currents have been limited in the past by chokes employed in the current paths between groups, but such means do not eliminate the undesirable currents. Theoretically, intergroup circulating currents can be eliminated by insuring that only one current-conducting group is permitted to conduct at a time. This can be accomplished by blocking diverting or otherwise suppressing the switching pulses supplied to the rectifying and switching devices of one group while permitting the switching pulses supplied to the other group of rectifying and switching devices to activate or fire them in the usual sequence known in the cycloconverter art. One of the objects of my invention is to provide means for preventing intergroup circulating currents in a cycloconverter by blocking, diverting or otherwise blanking the firing pulses supplied to one group of switching and rectifying devices while the other group is conducting and supplying output current.

In order to provide an alternating current output, the positive and negative groups of switching and rectifying devices must conduct alternately and, therefore, it is another object of my invention to provide means for preventing intergroup circulating currents in a cycloconverter by alternately blocking, diverting or otherwise blanking the firing pulses supplied to the two groups. This function will be referred to in the description that follows as alternating group blanking or group switching.

Another object of my invention is to provide such circuit means which selectively switches or blanks the cycloconverter groups in accordance with current information received from the two current-carrying groups.

Another object is to provide such circuit means that acts to selectively blank the firing pulses supplied to each of the current-carrying groups in accordance with current information derived from the other current-carrying group. For example, the circuit means of my invention acts to blank firing pulses intended for the positive group in response to current conducted by the negative group and to blank firing pulses intended for the negative group in response to current conducted by the positive group. In theory, such an arrangement provides alterations in the group switching whenever the output current of the cycloconverter reaches zero current.

Alternating group switching timed in accordance with zero current in the alternating output current has certain limitations in practice, however, which produce undesirable results in the cycloconverter operation. For example, when sensing an alternating output current or an alternating current corresponding thereto, it is difficult to accurately sense the precise instant at which the alternating output current is zero. It will be apparent that, if alterations in the group switching which take place either before or after the time when the alternating output current is, in fact, zero, the cycloconverter output wave form will be distorted and the output power diminished.

Also, if the switching and rectifying devices of current-conducting groups are of the type which are turned on by a control element which then loses control and is unable to turn them off, such as thyratrons or silicon-controlled rectifiers, the possibility exists that a blanked or nonconducting group may be turned on before all of the switching and rectifying devices in the previously conducting group have regained blocking control, even though the firing pulses to the control elements of the switching and rectifying devices have been suppressed, diverted or otherwise blanked. Under such circumstances, an intergroup circulating current path may be provided and/or a particular phase of a polyphase cycloconverter input may be shorted if a switching and rectifying device in each group and common to a single supply phase happens to be conducting at the same time. Another object of my invention, therefore, is to provide circuit means for accomplishing alternating group switching which prevents the premature turning on of a non-conducting current-carrying group.

Briefly, I accomplish the foregoing objects by circuit means which acts in accordance with the alternating output current of a cycloconverter to provide an alternating group switching signal to each of the current-carrying groups and which incorporates a time delay between the signal for turning off the conducting current-carrying group and the signal for turning on the non-conducting current-carrying group. The time delay provides a dead period when neither current-carrying group is conducting. This insures that any errors in the detection of the output current zero will not cause a premature turn on of the non-conducting group and that the switching and rectifying devices in the previously conducting current-carrying group have all regained a high impedance or current blocking state.

The various features and advantages of my invention may be understood from the detailed description below and the accompanying drawing showing a preferred form of an alternating group switching circuit embodying my invention and illustrating its relationship to a conventional cycloconverter such as described above.

The upper part of the drawing diagrammatically shows a cycloconverter generally indicated by the reference numeral 10 comprising a positive current-conducting group 11, a negative current-conducting group 12 and associated firing circuits 14 and 15, respectively. The positive and negative groups 11 and 12, respectively, are connected in parallel between a supply or input and the cycloconverter output which in turn is connected to a load. As indicated by the controlled rectifier symbols within the blocks 11 and 12 representing the positive and negative current-conducting groups, the two groups are connected back-to-back with respect to the output circuit so that each group of switching and rectifying devices may alternatingly provide a half cycle of each full cycle of output current $I_L$.

Associated with the positive group 11 and its firing circuit 14 is a transistor 16 arranged to divert firing signals supplied by firing circuit 14 from positive group 11 through its collector-emitter circuit to ground. Thus, when a suitable signal is supplied to the base of transistor 16, positive group 11 is rendered non-conducting because the firing signals for activating its switching and rectifying devices are blanked or diverted from it. In the absence of such an appropriate signal to the base of transistor 16, positive group 11 is rendered conducting because the firing signals provided by firing circuit 14 are permitted to reach the switching and rectifying devices making up positive group 11.

A transistor 17 is similarly arranged with respect to negative group 12 and its firing circuit 15 for controlling the conduction of negative group 12 in accordance with signals supplied to the transistor base.

In the lower part of the drawing is shown a cycloconverter alternating output current sensor indicated generally by the reference numeral 21. Current sensor 21 comprises a center-tapped current transformer having a secondary winding 22 inductively associated with cycloconverter output conductor 23 and provided with output terminals 24 and 25 at its opposite ends and a center tap terminal 26. The output voltage of secondary winding 22 is preferably limited to an appropriate maximum value by four sets of serially connected diodes 27, 28, 29 and 30. Diode sets 27 and 28 are connected in opposite directions across that portion of secondary winding 22 between output terminal 24 and center tap 26. Diode sets 29 and 30 are connected in opposite directions across that portion of secondary winding 22 between output terminal 25 and center tap 26. The output voltage appearing between either of the output terminals 24 or 25 and the center tap 26 is thus limited to the value of the forward voltage drop across diode sets 28 and 30 or diode sets 27 and 29. Any number of serially connected diodes may be employed in each set, of course, in order to determine the desired maximum output voltages appearing between the output terminals and center tap of secondary winding 22.

Secondary winding 22 of current sensor 21 is so arranged that pulses of a given polarity with respect to center tap 26 alternately appear at output terminals 31 and 32 of current sensor 21. The pulses appearing at output terminal 31 are, for example, provided by the alternating output current $I_L$ provided when negative group 12 is conducting. The current pulses appearing at output terminal 32 are then provided by the alternating output current $I_L$ provided when positive group 11 is conducting. The voltage pulses appearing at the output terminals 31 and 32 are generally clipped sinusoidal pulses resembling square wave, low amplitude pulses.

Current sensor 21, as particularly described above and as shown in the drawing, comprises a preferred means for supplying alternating trigger pulses to the alternating group switching circuit means of my invention. It is not to be implied, however, that other suitable sensing means cannot be use. Other current sensor arrangements, including composite sensing of the polyphase input currents to the cycloconverter, for example, may be utilized so long as they provide alternate output pulses at two output terminals in accordance with the sensed alernating output current or an alternating current corresponding thereto and of the appropriate polarity with respect to each other and ground to trigger the alternating group switching circuit means as described below.

Also shown in the lower part of the drawing is a broken line box 33 outlining the alternating group switching circuit means comprising a novel feature of my invention. The circuit means comprises a pair of NPN transistors 34 and 35 interconnected generally as an astable multivibrator. The emitters 36 and 37 of transistors 34 and 35, respectively, are connected together and to ground. The base 38 of transistor 34 is connected to output terminal 31 of current sensor 21 and to collector 39 of transistor 35 through the parallel combination of resistor 40 and capacitor 41. Base 42 of transistor 35 is connected to output terminal 32 of current sensor 21 and to collector 43 of transistor 34 through the parallel combination of resistor 44 and capacitor 45.

Collectors 43 and 39 of the two transistors are each connected to a source of positive direct current voltage through a resistor 46 and 47, respectively. While the D.C. voltage sources are shown as being separately provided at terminals 48 and 49, a single source can serve as well.

That portion of the circuit described above may be characterized as an astable circuit because in the absence of any signals from current sensor 21 to bases 38 and 42 of transistors 34 and 35, respectively, the circuit free runs and switches at a high frequency from one state to the other in the manner of a multivibrator. The switching frequency is dependent on the voltage of the D.C. supply and the resistance and capacitance in the cross-couplings of transistors 34 and 35. As explained below, this free-running action can be interrupted by a suitable voltage signal applied to the base of one of transistors 34 or 35 as, for example, from one of the output terminals of current sensor 21. As employed in connection with a cycloconverter, the switching of the alternating group switching circuit means outlined by broken line box 33, however, is controlled and generally synchronized with the alternations of the output current $I_L$ by the output signals of current sensor 21 appearing at terminals 31 and 32 thereof and connected to bases 38 and 42 of transistors 34 and 35.

An RC network consisting of resistor 50 and capacitor 51 is associated with transistor 34 being connected as shown between positive D.C. terminal 48 and ground. A diode or rectifier 52 is connected between the junction of resistor 50 and capacitor 51 and the junction of resistor 46 and collector 43 of transistor 34 and arranged to provide low impedance conduction toward collector 43.

Another RC network consisting of resistor 53 and capacitor 54 is associated with transistor 35 being connected as shown between positive D.C. terminal 49 and ground. A diode or rectifier 55 is connected between the junction of resistor 53 and capacitor 54 and the junction of transistor 47 and collector 39 of transistor 35 and arranged to provide low impedance conduction toward collector 39.

Associated with the RC network consisting of resistor 50 and capacitor 51 is an NPN transistor 56 having its base 57 connected through a Zener diode 58 as shown to the junction between resistor 50 and capacitor 51. Positive D.C. voltage is connected to collector 59 of transistor 56 through resistor 60. Emitter 61 is connected to ground.

Another NPN transistor 62 is associated with the RC network consisting of resistor 53 and capacitor 54. Base 63 is connected through a Zener diode 64 as shown to the junction of resistor 53 and capacitor 54. Positive D.C. voltage is applied to collector 65 of transistor 62 through resistor 66 while emitter 67 is connected to ground.

Output signals alternately appear at the collectors 59 and 65 of transistors 56 and 62, respectively, in accordance with changes in state or switching the alternating group switching circuit means. The output signals appear alternately at collectors 59 and 65 and may never both appear at the same time though both may be off at the same time as will be described below.

As used in conjunction with the cycloconverter, collector 59 is connected by conductor 68 to the base of transistor 16 and collector 65 of transistor 62 is connected by conductor 69 to the base of transistor 17. As will be explained more fully below in connection with the circuit operation and its relationship to the cycloconverter, an output signal appears at collector 59 when negative group 12 of the cycloconverter is providing output current and at collector 65 of transistor 62 when positive group 11 is providing output current. In this manner, the alternating output signals of circuit means 33 are employed to divert, suppress or otherwise blank the firing signals intended for positive group 11 when negative group 12 is conducting and vice versa.

The operation of the alternating group switching circuit means is described below in conjunction with a cycloconverter. Let it be assumed that current provided by positive group 11 of cycloconverter 10 is flowing in the output circuit and being supplied to the load. Current sensor 21 is arranged so that a voltage pulse appears at output terminal 32 and is applied to base 42 of transistor 35, turning it on and/or firing it to remain on and thereby stopping its normal free-running action. As is well known in flip-flop or multi-vibrator arrangements, each transistor is held in its particular state by the condition of the other and, therefore, transistor 34 is not conducting.

The non-conducting state of transistor 34 permits capacitor 51 of its associated RC network to be charged through resistor 50 from the D.C. voltage applied to terminal 48 to a potential above the breakdown voltage of Zener diode 58, turning on transistor 56 thereby effectively reducing to ground the potential supplied transistor 16 so that transistor 16 is held in a non-conducting state. When transistor 16 is not conducting, firing signals produced by firing circuit 14 are permitted to reach and activate switching and rectifying devices making up positive group 11 of the cycloconverter. Thus, when current supplied by positive group 11 is flowing in the output circuit of the cycloconverter, the firing signals supplied to positive group 11 are not diverted or blanked and are permitted to control the switching and rectifying devices in positive group 11.

Because transistor 35 is conducting as described above, capacitor 54 of its associated RC network is effectively short circuited, preventing the charging of capacitor 54 and the build-up of a potential sufficient to break down Zener diode 64. Therefore, transistor 62 is in a non-conducting state resulting in a potential appearing at its collector 65. This potential is applied by conductor 69 to the base of transistor 17 and turns it on. When transistor 17 is conducting, firing pulses produced by firing circuit 15 are diverted or blanked and otherwise not permitted to activate the switching and rectifying devices in negative group 12. The blanking of the firing pulses to negative group 12 effectively prevents conduction by any of it switching and rectifying devices.

The alternating group switching circuit remains in the stable state described above providing blanking of the firing pulses to negative group 12 as long as positive group 11 is conducting, thereby eliminating any intergroup circulating current paths in the cycloconverter.

When current in positive group 11 ceases to flow at the end of the positive half cycle of cycloconverter alternating output current, transistor 35 turns off and transistor 34 turns on due to their free-running multi-vibrator relationship. Conduction by transistor 34 shorts out capacitor 51, completely discharging it to a potential below the threshold level of Zener diode 58. Consequently, transistor 56 is turned off and a potential is applied through conductor 68 to transistor 16, turning the latter on and blanking the firing pulses produced by firing circuit 14. The turning on of transistor 16 effectively prevents any further turning on of the switching and rectifying devices of positive group 11.

Turning off of transistor 35 permits capacitor 54 to be charged through resistor 53 from the positive D.C. voltage applied to terminal 49. Dependent upon the relative values of resistor 53, capacitor 54 and the positive D.C. voltage applied to terminal 49, more or less time will pass until capacitor 54 is charged to the threshold level of Zener diode 64, thereby delaying by some fixed period of time the turning on of transistor 62 after transistor 35 is turned off. This, in turn, delays the removal of the output signal at collector 65 of transistor 62 and in conductor 69, thereby also delaying the turning off of transistor 17 and the unblanking or passing of the firing pulses from firing circuit 15 to initiate conduction by negative group 12.

After the time delayed signal turns off transistor 17, firing of the switching and rectifying devices in negative group 12 is initiated by firing pulses from firing circuit 15 and negative group 12 begins to conduct current to the output circuit of the cycloconverter. The appearance of current conducted by negative group 12 in the output circuit of the cycloconverter is detected by current sensor 21 which provides a pulse at its output terminal 31. This pulse tends to hold transistor 34 in its conducting condition. It will be noted that transistor 34 is turned on by free-running multi-vibrator action at some time prior to the appearance in the output circuit of the cycloconverter of current conducted by negative group 12. The signal for holding transistor 34 on appears at output terminal 31 of current sensor 21 before transistor 34 can return to its non-conducting state due to the turn-on of transistor 35 in accordance with the free-running multi-vibrator action of the circuit. This is true even though the appearance of output current conducted by negative group 12 is delayed somewhat by the delayed application of firing signals from firing circuit 15 to negative group 12. This timing relationship, as will be well understood by those skilled in the art, depends upon the time constants of the RC networks interconnecting the collectors and bases of transistors 34 and 35 as well as the time constant of the RC networks between transistors 34 and 56 and between transistors 35 and 62.

When the half cycle of alternating output current thus provided by negative group 12 falls to zero, the corresponding output pulse provided by current sensor 21 terminates, permitting transistor 34 to switch to an off condition and transistor 35 to an on condition by multi-vibrator action. With transistors 34 and 35 in the aforementioned condition, the firing signals from firing circuit 15 are suppressed or blanked from switching the rectifying devices of negative group 12 of the cycloconverter and, at some time later, the firing signals from firing circuit 14 are permitted to control the switching and rectifying devices making up positive group 11 of the cycloconverter. While transistor 35 is in a conducting condition as a result of the aforementioned multi-vibrator action, current appears in the output circuit conducted by positive group 11 and a corresponding output pulse appears at output terminal 32 of current sensor 21 which holds transistor 35 in a conducting condition.

It will be apparent from the foregoing that each time the alternating output current of the cycloconverter returns to zero, the signal provided by current sensor 21 and corresponding to the previous half cycle of output current is terminated and ceases to be applied to the base of one or the other of transistors 34 and 35 so that the multi-vibrator section of the group switching circuit reverts to its free-running condition. This means that each time the alternating output current of the cycloconverter returns to zero, the previously conducting one of transistors 34 and 35 turns off and the previously non-conducting one of these two transients turns on by its own inherent multi-vibrator action. Such a self-operating characteristic is necessary in order to unblank the previously blanked current-conducting group so that output current may reappear in the output circuit to provide the overriding control of the group switching circuit.

When the on-off relationship of multi-vibrator transistors 34 and 35 is switched, the output of the group switching circuit means 33 almost immediately blanks the firing signals being supplied to the then conducting one of the cycloconverter group. The unblanking or passing of firing signals to the previously non-conducting cycloconverter group, however, is delayed as determined by the time constant of the applicable RC network in the group switching circuit means providing a dead band or period of time after the cycloconverter alternating output current falls to zero. During this dead period, both the positive and negative cycloconverter groups are blanked and receive no firing pulses from their respective firing circuits. The dead period in the conduction cycle of the two cycloconverter groups thus provided insures that any and all of the switching and rectifying devices in the last-to-conduct group that are conducting at the time the output current falls to zero will have a chance to recover their blocking state prior to the unblanking or passing of firing pulses to the other and next-to-conduct cycloconverter group. Thus, the possibility of intergroup circulating current paths being set up at the time of group switching or the possibility of a short circuit being applied across one of the supply phases of the cycloconverter is minimized. Further, the dead period in the blanking pattern effectively accommodates any inaccuracies in the detection of the zero output current of the cycloconverter by the current sensor. The fixed time delay between the blanking of one group and the unblanking of the other group required to insure the elimination of intergroup circulating currents need not be very great or have any substantial effect on the output of the cycloconverter.

With respect to the frequency of the multi-vibrator section of the alternating group switching circuit, it will be understood that the time constants of the cross-coupling RC networks must be selected with respect to the time constant of the subsequent RC delay networks so that when the multi-vibrator is operating in a free-running condition it will remain in one or the other of its switching states a sufficient length of time to charge the appropriate one of the time delay capacitors 51 or 54 to a level above the avalanche breakdown voltage of its associated Zener diode. In other words, when free running, the multi-vibrator section comprising cross-coupled transistors 34 and 35 must have a period which permits an output signal to be produced corresponding to each of its two switching states. This relationship between the time constants of the cross coupling RC networks and the time delay networks insures that ultimately and at the appropriate time the previously non-conducting one of the positive and negative cycloconverter groups will be unblanked and produce an output current sufficient for holding the multi-vibrator section in one or the other of its two switching states.

It will be noted that the free-running feature of the group switching circuits will, in the event of no conduction occurring in a particular cycloconverter group, automatically switch to the other group and continue to do so until conduction occurs. This feature is advantageous particularly when large transients are present in the output current and during which the conduction time of a particular cycloconverter group is small or non-existent. It is also useful in certain cases when the potential existing at the output of the cycloconverter is momentarily large enough to prevent conduction of the rectifiers in a group.

It will also be noted that firing pulses are supplied to only one of the cycloconverter groups at any given time, effectively preventing the establishment of any intergroup circulating current paths during the normal conduction periods of the positive and negative cycloconverter groups.

The alternating group switching circuit means disclosed and described herein thus insures zero output during switching and thus the complete elimination of intergroup circulating currents in a cycloconverter and substantially contributes to the reduction in output distortion and losses.

System weight is reduced because chokes in the output circuit for suppressing circulating currents are not required and the overall efficiency of the system is increased.

While I have described the means for diverting, suppressing or otherwise blanking the firing signals produced by a firing circuit associated with one or the other of the two cycloconverter current conducting groups as being transistors connected as shown, it will be understood that other suitable means may be employed to utilize the output signals of the alternating group switching circuit means blanking signals and my invention comprehends such other suitable means.

While the circuit embodying my invention as described above and shown in the drawings contains transistors of the NPN type, it will be understood to those skilled in the art that transistors of the PNP type may be substituted if the proper and well-known changes in polarities are made. My invention comprehends not only the circuit shown and described and employing NPN transistors but also comprehends an equivalent circuit which might be built up of PNP transistors.

Those skilled in the art will appreciate that various changes and modifications can be made in the apparatus described herein without departing from the spirit and scope of the invention.

I claim:

1. A signal-producing circuit comprising
   a D.C. voltage source,
   an astable multi-vibrator switching means connected to said D.C. voltage source and free running between two switching states,
   a pair of resistor-capacitor networks operatively connected to said multi-vibrator switching means and across said voltage source and alternately and oppositely chargeable and dischargeable from said source in response to the alternate switching of said multi-vibrator switching means between its two switching states,
   an output circuit means operatively connected to said voltage source and to each of said resistor-capacitor networks and responsive to the charged and discharged condition of its associated capacitor for providing an output signal dependent on the level of charge of its associated capacitor.

2. A circuit according to claim 1 in which each of said output circuit means comprises a voltage-responsive switch connected between said D.C. voltage source and ground potential and having a control element connected through an avalanche breakdown rectifying device to the junction of the resistor and capacitor of its associated resistor-capacitor network whereby said switch is closed when the charge on said capacitor exceeds the avalanche breakdown potential of said rectifying device preventing the appearance of an output signal at the voltage source side of said switch and open when the charge on said capacitor falls below the avalanche breakdown potential of said rectifying device providing an output signal at the voltage source side of said switch.

3. A circuit according to claim 2 in which said multivibrator switching means comprises a pair of switches connected together and to said voltage source in a multivibrator configuration, each of said switches being connected in parallel with the capacitor of its associated resistor-capacitor network whereby during the free-running operation of said pair of multivibrator switches one of said pair of switches closes permitting its associated capacitor to be rapidly discharged to below the avalanche breakdown potential of said rectifying device responsive thereto and whereby the other of said pair of switches opens permitting its associated capacitor to be charged from said voltage source through its associated network resistor in accordance with the time constant and resistor and capacitor combination to the avalanche breakdown level of said avalanche breakdown device responsive thereto.

4. A circuit according to claim 1 together with a pair of inputs for input signals operatively connected to said multi-vibrator switching means, one of said inputs being responsive to an input signal to hold said multi-vibrator switching means in one of its switching states and the other of said inputs being responsive to a like input signal to hold said multi-vibrator switching means in the other of its switching states.

5. A signal-producing circuit comprising
   a D.C. voltage source,
   a pair of inputs for receiving input signals,
   an astable multi-vibrator switching means connected to said inputs and to said D.C. voltage source and having two switching states and responsive to a signal applied to one of said inputs to maintain one of its two switching states and to a signal applied to the other of said inputs to maintain the other of its two switching states and free running between its two switching states in the absence of a signal to either of said pair of inputs,
   a pair of resistor-capacitor networks operatively connected to said multi-vibrator circuit means and said voltage source and alternately and oppositely chargeable and dischargeable from said source in response to the alternate switching of said multi-vibrator means between its two switching states,
   output circuit means operatively connected to said voltage source and to each of said resistor-capacitor networks and responsive to the charged and discharged condition of its associated capacitor for providing an output signal dependent on the level of charge of its associated capacitor,
   said output circuit means comprising a voltage-responsive switch connected between said D.C. voltage source and ground potential and having a control element connected through an avalanche breakdown rectifying device to the junction of the resistor and capacitor of its associated resistor-capacitor network whereby said switch is closed when the charge on said capacitor exceeds the avalanche breakdown potential of said rectifying device preventing the appearance of an output signal at the voltage source side of said switch and open when the charge on said capacitor falls below the avalanche breakdown potential of said rectifying device providing an output signal at the voltage source side of said switch,
   said multi-vibrator switching means comprising a pair of switches connected together and to said voltage source in a multi-vibrator configuration, each of said switches being connected in parallel with the capacitor of its associated resistor-capacitor network whereby upon switching from one to the other of its switching states one of said pair of switches closes permitting its associated capacitor to be rapidly discharged to below the avalanche breakdown potential of said rectifying device responsive thereto and whereby the other of said pair of switches opens permitting its associated capacitor to be charged from said voltage source through its associated network resistor in accordance with the time constant and resistor and capacitor combination to the avalanche breakdown level of said avalanche breakdown device responsive thereto.

6. The combination of
   a cycloconverter having a supply circuit, an output circuit, a pair of current-conducting groups of switching and rectifying devices connected in parallel with each other between and back-to-back with respect to said supply and output circuits for alternately conducting current from said supply circuit to said output circuit and from said output circuit to said supply circuit to provide an alternating cycloconverter output current, and means for providing firing pulses to the switching and rectifying devices of each of said current-carrying groups for controlling the current conducted by said groups between said supply and output circuits,
   means to blank and unblank the firing pulses provided to the switching and rectifying devices of each of said current-carrying groups in response to blanking and unblanking signals.
   means for sensing the conducting and non-conducting state of each of said current-carrying groups and for indicating the states of conduction of each of said current-carrying groups by signals corresponding thereto.
   group switching circuit means interconnecting each of said blanking and unblanking means and said sensing and indicating means and responsive to the indicating signals of said sensing and indicating means for providing blanking signals to that one of said blanking and unblanking means whose associated current-conducting group reaches a non-conducting condition and for providing unblanking signals to the other of said blanking and unblanking means a fixed time period thereafter.

7. The combination according to claim 6 in which said means associated with each of said current-carrying groups to blank and unblank firing pulses provided thereto comprises a transistor switch in circuit with its associated current-carrying group and said means for providing firing pulses thereto and having a blanking state and an unblanking state, said transistor switch having a control electrode in circuit with said group switching circuit means for controlling the state of said transistor switch in accordance with blanking and unblanking signals applied to its control electrode.

8. The combination according to claim 6 in which said sensing and indicating means comprises a center-tapped current transformer winding inductively associated with said cycloconverter output circuit and parallel back-to-back sets of rectifying devices connected in parallel with each half of said winding for alternately providing at opposite ends of said winding output signals of like polarity with respect to said center tap in accordance with alternations in the sensed cycloconverter output current.

9. The combination according to claim 6 in which said group switching circuit means comprises
   a D.C. voltage source, an astable multi-vibrator switching means having a pair of inputs connected to said sensing and indicating means and to said D.C. voltage source and having two switching states, said multi-vibrator switching means being responsive to indications from said sensing and indicating means of the conducting and non-conducting state of said current-carrying groups for holding it in one of its switching states and free running between its two switching states in the absence of an indication from said sensing and indicating means.
   a pair of resistor-capacitor networks operatively connected to said multi-vibrator switching circuit means and said voltage source and alternately and oppositely chargeable and dischargeable from said source in response to the alternate switching of said multi-vibrator switching means between its two switching states.
   output circuit means operatively connected to said voltage source and to each of said resistor-capacitor networks and responsive to the charged and discharged condition of its associated capacitor for providing an output signal only when the charge of its associated capacitor is below a predetermined potential.

10. The combination of
    a cycloconverter having a supply circuit, an output circuit, a pair of current-conducting groups of switching and rectifying devices connected in parallel with each other between and back-to-back with respect to said supply and output circuits for alternately conducting current from said supply circuit to said output circuit and from said output circuit to said supply circuit to provide an alternating cycloconverter output current, and means for providing firing pulses to the switching and rectifying devices of each of said current-carrying groups for controlling the current conducted by said groups between said supply and output circuits.

means to blank and unblank the firing pulses provided to the switching and rectifying devices of each of said current-carrying groups in response to blanking and unblanking signals.

means for sensing the conducting and non-conducting state of each of said current-carrying groups and for indicating the states of conduction of each of said current-carrying groups by signals corresponding thereto, said sensing and indicating means comprising a center-tapped current transformer winding inductively associated with said cycloconverter output circuit and parallel back-to-back sets of rectifying devices connected in parallel with each half of said winding for alternately providing at opposite ends of said winding output signals of like polarity with respect to said center tap in accordance with alternations in the sensed cycloconverter output current, group switching circuit means interconnecting each of said blanking and unblanking means and said sensing and indicating means and responsive to the indicating signals of said sensing and indicating means for providing blanking signals to that one of said blanking and unblanking means whose associated current-conducting group reaches a non-conducting condition and for providing unblanking signals to the other of said blanking and unblanking means a fixed time period thereafter, said group switching circuit means comprising a D.C. source, an astable multi-vibrator switching means having a pair of inputs connected to said sensing and indicating means and to said D.C. voltage source and having two switching states, said multi-vibrator switching means being responsive to indications from said sensing and indicating means of the conducting and non-conducting state of said current-carrying groups for holding it in one of its switching states and free running between its two switching states in the absence of an indication from said sensing and indicating means, a pair of resistor-capacitor networks operatively connected to said multi-vibrator switching circuit means and said voltage source and alternately and oppositely chargeable and dischargeable from said source in response to the alternate switching of said multi-vibrator switching means between its two switching states.

output circuit means operatively connected to said voltage source and to each of said resistor-capacitor networks and responsive to the charged and discharged condition of its associated capacitor for providing an output signal only when the charge of its associated capacitor is below a predetermined potential.

References Cited by the Examiner
UNITED STATES PATENTS

| | | | |
|---|---|---|---|
| 2,838,675 | 6/1958 | Wanlass | 331—113 |
| 3,193,782 | 7/1965 | Trojak | 307—88.5 |
| 3,227,965 | 1/1966 | Madsen | 331—113 |

JOHN F. COUCH, *Primary Examiner.*

W. SHOOP, *Assistant Examiner.*